Patented June 17, 1930

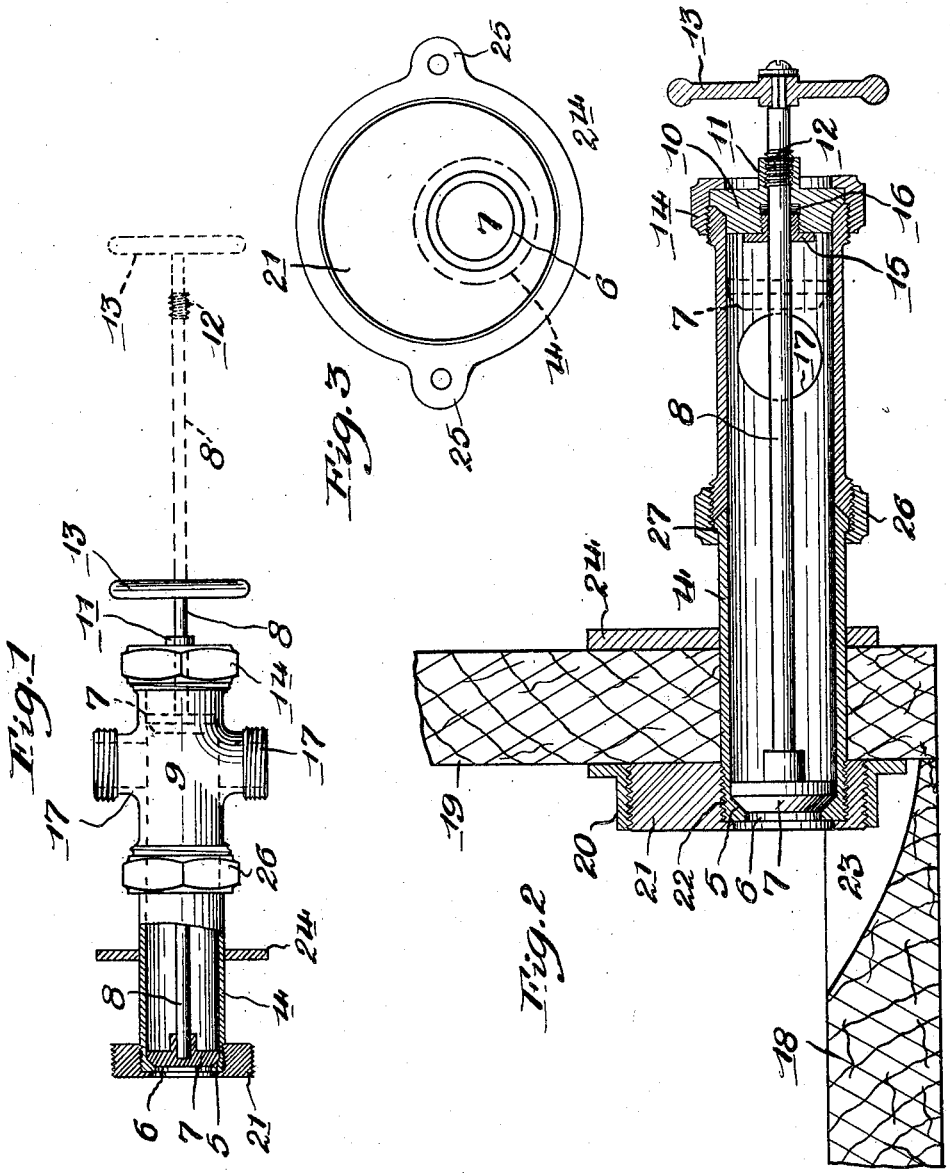

1,765,272

UNITED STATES PATENT OFFICE

ALBERT C. HOUGLAND, OF ST. PAUL, MINNESOTA, ASSIGNOR TO CRANE COMPANY OF MINNESOTA, OF ST. PAUL, MINNESOTA, A CORPORATION OF MINNESOTA

VALVE

Application filed January 11, 1928. Serial No. 245,989.

It is the object of this invention to provide a valve in which the closure is substantially flush with an end of the casing or conduit so that fluid contents of a container in communication with said end are excluded from the valve casing and connections.

One important use of my valve is upon the large or commercial pasteurizers for milk and cream. In such apparatus a large vat is provided in which the heat treatment of the liquid is conducted. To facilitate draining the liquid from the vat, after pasteurization, suitable piping is connected to the bottom of the vat and a drain valve is located in the piping. Heretofore the drain valves have been so constructed and located as to allow a substantial amount of the lactic fluid to enter the valve casing or restricted connections between the valve closure and vat. It has been found that the liquid within this restricted space or valve casing during the pasteurizing treatment is not heated to the temperature necessary to destroy pathogenic bacteria and subsequently pollutes the entire body of fluid. The present invention is designated primarily to avoid this defect in old valves.

Referring to the accompanying drawings which illustrate the best form of my device at present known to me Figure 1 is a plan view of my improved valve partially in horizontal section; Fig. 2 is a central vertical section through the valve attached to a vat of common type and Fig. 3 is an inner end view of the valve and attaching plate.

In the drawings I have used the numeral 4 to indicate a straight tubular member of the valve casing which is formed with a conical valve seat 5 at its normally inner end. An intake opening 6 is located centrally adjacent to the valve seat 5. A closure 7 is formed to fit the seat 5 being fixed upon an end of an operating rod 8. This rod 8 extends axially through the member 4 and also through a member 9 of the casing arranged in continuation of the member 4. The outer end of the member 9 is closed by a cap 10 having a central bore through which the rod 8 passes and a threaded neck 11 adapted to engage threads 12 on the rod 8. An end of the rod 8 projects beyond the threads 12 and is fitted with a suitable operating wheel 13 for turning said rod and for sliding it longitudinally through the cap 10. A retaining nut 14 is arranged to secure the cap 10 in the end of the part 9. To prevent leakage along the rod 8 through the cap 10 a packing nut 15 is threaded in the inner surface of the cap 10 and arranged to compress suitable stuffing 16 against said rod. Communicating with the member 9 of the valve casing is a pair of branch pipes 17 adapted to be connected with suitable hoses or other conduits through which the fluid may be passed.

In Fig. 2 I have shown the valve attached to a vat having a bottom 18 and an end 19 from which the fluid is to be withdrawn. To connect the valve with such a vat an internally threaded collar 20 is secured upon the inner surface of the end 19 and an externally threaded disc 21 is screwed into the collar 20. A threaded opening 22 in the disc 21 is disposed eccentrically in said disc and adapted to receive a threaded inner end of the casing member 4. This opening 22 is offset from the center of the disc 21 downward and a recess 23 is formed in the bottom 18 of the vat so as to facilitate withdrawing the entire contents of the vat. To afford a firm support for the valve upon the exterior of the end 19 a plate 24 adapted to be secured to said end is provided with an opening to receive the valve member 24. This plate has perforated ears 25 to receive attaching screws or bolts.

The valve casing is made in two members 4 and 9 to facilitate proper positioning of the branch pipes 17 after the member 4 has been secured in the disc 21. The members 4 and 9 are coupled together by means of a sleeve 26 which is threaded upon the casing member 9 and formed to engage an annular shoulder 27 upon the outer end of the casing member 4.

In use the valve closure 7 is normally held upon its seat 5 by the threads 12 engaging the neck 11. It will be evident that the closure of the opening 6 is substantially flush with the inner end of the valve casing so that fluid in the vat is not allowed to enter the valve casing or connections. When the valve is to be opened the wheel 13 is merely rotated, to disengage the threads 12 upon the rod 8, when said rod is withdrawn longitudinally to carry the closure 7 past the branch pipe 17 as indicated in dotted lines in Figs. 1 and 2. This operation is facilitated by my arrangement of a short thread 12 for seating the valve. Obviously to close the valve it is only necessary to slide the rod 8 inward to a point where the threads 12 will engage the neck 11 and then to rotate the wheel 13 until the closure 7 is firmly seated. Another important feature of my valve is the arrangement which facilitates cleaning. To clean the valve the screw cap 13 is merely removed. This frees the part 10, valve closure and operating rod and wheel so that these parts may be withdrawn from the valve casing quickly and easily. With the valve closure and operating mechanism removed the casing affords a straight, unobstructed passageway for the insertion or cleaning brushes or the like.

Having described my invention what I claim is new and desire to protect by Letters Patent is:

In a valve, a casing, a straight tubular member of said casing adapted to extend through the wall of a vat or the like and formed with an opening in its inner end, an internal valve seat formed on said end around said opening, a closure arranged to removably fit said seat, a second tubular member of said casing disposed in continuation of said first mentioned member, a coupling between said members having a sleeve revoluble independently of said members to permit rotation of said second member independently of said first mentioned tubular member, said coupling being located outside of said vat and said members having a smooth, continuous bore without obstruction, an operating rod for said closure extending axially through both members of said casing and arranged to draw said closure from one end to the other of said casing, a removable cap on the outer end of said second member, a laterally projecting conduit communicating with said second member of the casing and means associated with said operating rod for retaining said closure on its seat, said closure and rod being removable through the casing upon the removal of said cap.

In testimony whereof, I have hereunto signed my name to this specification.

ALBERT C. HOUGLAND.